UNITED STATES PATENT OFFICE.

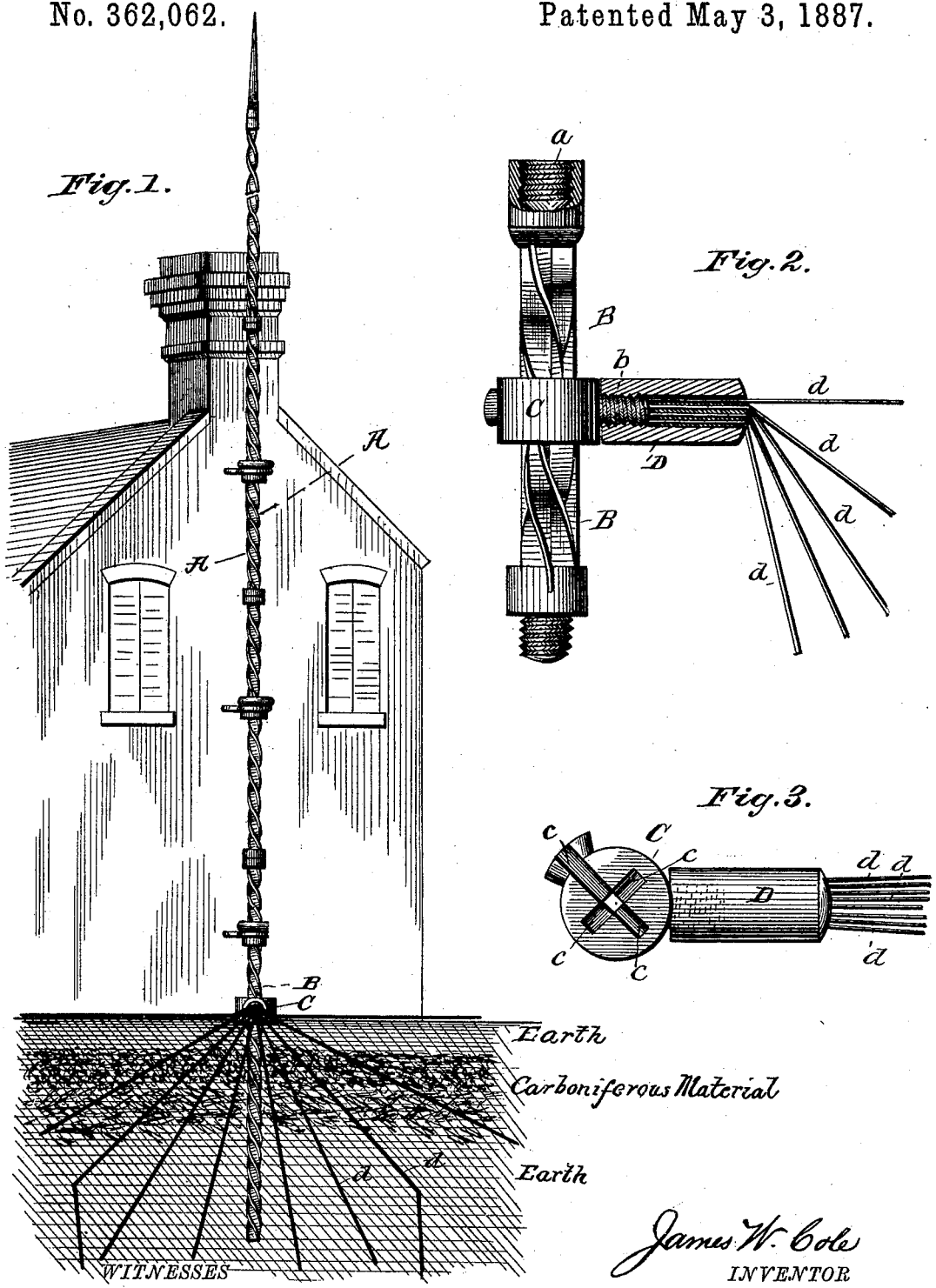

JAMES W. COLE, OF GREENCASTLE, INDIANA.

MULTIPLE SUBSIDIARY GROUND-TERMINAL FOR LIGHTNING-RODS.

SPECIFICATION forming part of Letters Patent No. 362,062, dated May 3, 1887.

Application filed January 15, 1887. Serial No. 224,456. (No model.)

*To all whom it may concern:*

Be it known that I, JAMES W. COLE, a citizen of the United States, residing at Greencastle, Putnam county, Indiana, have invented new and useful Improvements in Multiple Subsidiary Ground-Terminals for Lightning-Rods, of which the following is a specification.

This invention relates to subsidiary multiple ground-terminals for electric conductors or lightning-rods; and it consists, substantially, in such features of improvement as will hereinafter be more particularly described, and pointed out in the claims.

In the ordinary construction and erection of lightning rods or conductors the ground-section of the rod is usually terminated in the earth a suitable distance for affording as nearly as possible a definite path for the conductivity of the fluid lightning between the water-beds of the earth and the storm-clouds, since it is well understood in the art that lightning discharged from a storm-cloud toward the earth always seeks a point or place having or possessed of the greatest degree of moisture, and when the upper surface of the earth surrounding the ground-section of the rod is dry the fluid will seek the natural moist beds or water below. In stony and dry soils, where sufficient moisture cannot be reached by terminating the ground section of the rod in the earth to the ordinary distance of from eight to twelve feet, it is necessary to employ some subsidiary earth-terminal, either leading off to a natural or artificial moist bed or one that acts to conduct water to the bed around the ground section or terminals, by which the immediate vicinity of the earth will be kept sufficiently moist for the purpose desired. Many contrivances have been heretofore devised for the accomplishment of these ends, but so far as I am aware none have proved entirely effectual, and, besides, the contrivances and arrangements resorted to in numerous instances are very cumbersome, and their connection with the main rod more or less imperfect.

In the practice of my invention I employ, in connection with the ground-section of the main rod, a lateral subsidiary multiple ground-terminal, consisting of a number of wires or rods so arranged or grouped together as to be branched outwardly from each other in all directions, so as to penetrate the bed of earth to greater or less extent, the said subsidiary terminal being attached or connected either above or beneath the surface of the earth. Preferably, I provide a ditch or trench in the earth, into which the wires are spread, and in very dry soil I fill the trench around the wires with any kind of scrap-iron spread over with cinders, charcoal, coke, ashes, or any other carboniferous substances that will retain the moisture collected in the trench and then cover the whole with natural soil. If more moisture can be reached by so doing, the lower or loose end of each separate wire or rod may be bent at different angles and inserted any desired depth in the earth, or the lower or loose end of some may be inserted, and others may be made to lie or extend horizontally either upon or beneath the surface of the earth; and the said rods may be made of different lengths in order to obtain varying depths to which they may be inserted in order to reach a greater extent of moist earth.

This subsidiary terminal may be applied to the main rod at the time of erection thereof, or at any other time thereafter, and it may be composed of any proper number of metallic rods, strips, or narrow plates, of any desired length, bound together at one end in any suitable manner and attached or secured to any proper device or clamp for connecting it with the main rod at any desired point between the lower end of the ground-section of the main rod at a point either a little above or a little below the surface of the earth, as may be deemed best.

Referring to the accompanying drawings, Figure 1 represents a view of a lightning-rod attached to the side of a house and having my improvements applied thereto, the same indicating the manner of spreading or branching out the wires of the subsidiary terminal. Fig. 2 represents a view of the ground-section of a lightning-rod, showing the manner of attachment of my improvements thereto; and Fig. 3 is a detail plan view showing the form of clasp preferably employed by me for attaching my device to the main rod.

Reference being had to the several parts by the letters marked thereon, A represents the main lightning-rod, and B represents the lower terminal or ground-section thereof, the latter being secured to the former by the ordinary screw-connection, a, as shown.

C represents a metallic clasp formed with openings c, conforming to the spiral shape of the rod, the same being also provided with a screw-threaded shank, b. This clasp forms a convenient means of attachment of my improvements to the main rod; but I desire to state that other forms can be resorted to, and that I do not wish to be understood as limiting myself thereto in precise detail.

D represents a cylindrical or other form of plug, preferably of brass, one end of which is drilled out to the proper extent or depth to form a socket for the reception of one end of each wire or rod d, while the other end is also drilled out to the proper extent, and formed with an internal screw-thread designed for the reception of the correspondingly-threaded shank b of the clasp C. After inserting the end of each rod or wire d into the socket prepared to receive them, I secure the ends together by filling all the space in the socket not occupied by the wires with hard solder, thus making one solid mass of metal, and forming, when attached to the main rod, a complete system of electric conductors.

From the foregoing description it is thought the intent and purpose of my invention will be fully understood, and it is evident that various modifications or changes could be resorted to in the practice thereof and still come within its scope. For instance, I do not wish to be confined to the precise manner herein described and shown of bunching or grouping one end of the wires or rods d together, nor to the manner of extending or bending them in various directions into the depths of the earth covering or surrounding them; neither do I confine myself to the precise means shown and described by which the connection of these rods or wires is made to the clasp C, embracing the ground-terminals of the main rod, for it is evident that instead of the form of connection shown the same may be made by a direct attachment, either of the wires themselves or by a clamp or clasp constructed of a single piece, instead of two separable parts or portions, my invention relating generically to the combination, with the main rod, of a series of wires or plates radiating therefrom in different directions and made to penetrate the bed of surrounding earth or to extend into an artificially-formed grounding-point for the electric fluid, constituted of a trench filled with carboniferous material for collecting and retaining moisture.

Having thus described my invention, what I claim as new, and desire to secure by Letters Patent, is—

1. The combination, with the clasp C, shaped to embrace or fit a lightning-rod and having a screw-threaded shank, of the plug D, formed in one end with a screw-threaded socket to fit said shank and having at its opposite end a series of metallic rods or plates adapted to be spread outwardly, in the manner and for the purpose described.

2. As an improvement in the mode of grounding lightning-rods in the earth, the same consisting in combining with the ground-terminal of the rod a clasp, C, having shank b, a plug, D, fitting the clasp and having a series of metallic rods or plates branching outwardly therefrom and extended into ditches filled with carboniferous substances covered over by natural soil or earth, substantially as described.

3. The combination, with the ground-section B, of the metallic plug D, having a drilled socket at one end and adapted for connection with said ground-section, and a series of metallic rods or plates grouped together at one end and inserted in the socket, the same being secured by solder, substantially as shown, and for the purpose described.

4. The combination, with the ground-section of a lightning-rod, of the clasp C, attached thereto above or beneath the surface of the ground, the plug D, secured to the shank of said clasp, as shown, and the series of metallic rods or plates secured in the socket, substantially as shown, and for the purposes described.

In testimony whereof I have hereunto set my hand in the presence of two subscribing witnesses.

JAMES W. COLE.

Witnesses;
  D. L. ANDERSON,
  H. B. RAGAN.